(12) United States Patent
Martin

(10) Patent No.: US 6,384,395 B1
(45) Date of Patent: May 7, 2002

(54) ACTIVE PIXEL TYPE DETECTOR

(75) Inventor: Didier Dieudonné Elisabeth Martin, Oegstgeest (NL)

(73) Assignee: Agence Spatiale Europeenne, Paris (FR)

( * ) Notice: Subject to any disclaimer, the term of this patent is extended or adjusted under 35 U.S.C. 154(b) by 37 days.

(21) Appl. No.: 09/599,001

(22) Filed: Jun. 22, 2000

(30) Foreign Application Priority Data

Jun. 23, 1999 (FR) .............................................. 99 08007

(51) Int. Cl.⁷ ................................................ H01L 27/00
(52) U.S. Cl. .................................. 250/208.1; 250/214 R
(58) Field of Search ........................ 250/208.1, 214 R, 250/214 A; 348/272, 281, 300, 302, 303, 305, 311

(56) References Cited

U.S. PATENT DOCUMENTS 5,426,292 A * 6/1995 Bird et al. ................ 250/208.1
5,631,704 A * 5/1997 Dickinson et al. .......... 348/308
5,831,258 A * 11/1998 Street ....................... 250/208.1
5,856,666 A * 1/1999 Moulsley .................. 250/208.1
5,886,343 A 3/1999 Miyawaki et al. ........ 250/208.1

FOREIGN PATENT DOCUMENTS

EP 349027 A1 1/1990

* cited by examiner

Primary Examiner—Robert H. Kim
Assistant Examiner—Jurie Yun
(74) Attorney, Agent, or Firm—Sughrue Mion, PLLC

(57) ABSTRACT

The invention relates to an active pixel type detector comprising M rows and N columns, each pixel having a top detector electrode and a bottom detector electrode, wherein the top detector electrodes are interconnected in rows or columns and the bottom electrodes are interconnected in columns or rows to form a row interconnection output for each row and to form a column interconnection output for each column, each row being taken to a first potential and being coupled to a row amplifier, and each column being taken to a second potential and being coupled to a column amplifier.

6 Claims, 2 Drawing Sheets

ACTIVE PIXEL TYPE DETECTOR

BACKGROUND OF THE INVENTION

There are two main types of integrated detector in existence, namely charge-coupled devices (CCD) in which the image is stored and then transferred pixel by pixel to an acquisition system, and active pixel detectors (APD) in which each pixel is biased and preamplified separately.

Some detectors, in particular those using superconducting tunnel junctions (STJs) can be used only in APD mode. An absorbed photon or particle generates a signal representing excess charge or current that must be read immediately, in that it cannot be stored for multiplexing purposes as is possible with CCD type sensors. This means that an individual acquisition system is required for each pixel. This in turn implies that numerous circuits must be implemented, and above all that it can become difficult or even impossible to implement the necessary connections when the number of pixels is high. The problem becomes even more critical with cryogenic detectors (e.g. STJ type detectors) where each additional connection wire increases heat flow into the cryogenic portion.

European patent application EP 0 809 394 (Kodak) proposes an architecture which enables read systems to be simplified, but without addressing the need to associate one such system with each pixel.

OBJECTS AND SUMMARY OF THE INVENTION

An object of the invention is to provide a detector which enables the number of read systems and the number of connections to be decreased.

The invention thus provides an active pixel type detector comprising M rows and N columns, each pixel having a top detector electrode and a bottom detector electrode, wherein the top detector electrodes are interconnected in rows or columns and the bottom electrodes are interconnected in columns or rows to form a row interconnection output for each row and to form a column interconnection output for each column, each row being taken to a first potential and being coupled to a row amplifier, and each column being taken to a second potential and being coupled to a column amplifier.

Whereas known detectors require M×N+1 connections and M×N read systems to be implemented, the device of the invention requires only M+N connections and M+N read systems. In particular, for a square matrix, having $N^2$ pixels (M=N), the device of the invention requires only 2N connections, and 2N read systems, instead of $N^2+1$ connections and $N^2$ read systems as is required in the prior art.

The row amplifiers may be high gain amplifiers, each having a first input taken to the first potential and having a second input connected to a corresponding one of said row interconnection outputs.

The column amplifiers may be high gain amplifiers each having a first input taken to the second potential and a second input connected to a corresponding one of said column interconnection outputs.

The invention applies in particular to superconducting tunnel junction detectors.

BRIEF DESCRIPTION OF THE DRAWINGS

The invention will be better understood on reading the following description given by way of non-limiting example and with reference to the drawings, in which.

MORE DETAILED DESCRIPTION

Figure 1A:
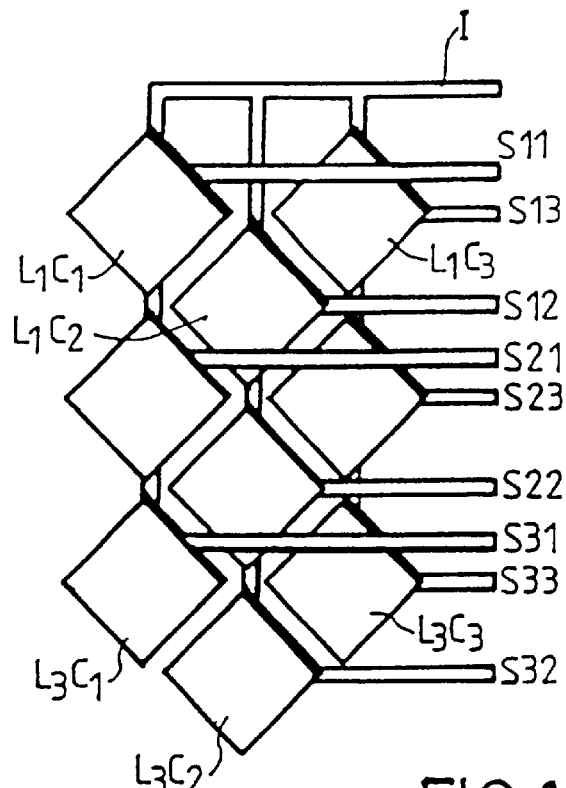
FIGS. 1a and 1b show how pixels and read systems are connected in the prior art.
Figure 1B:
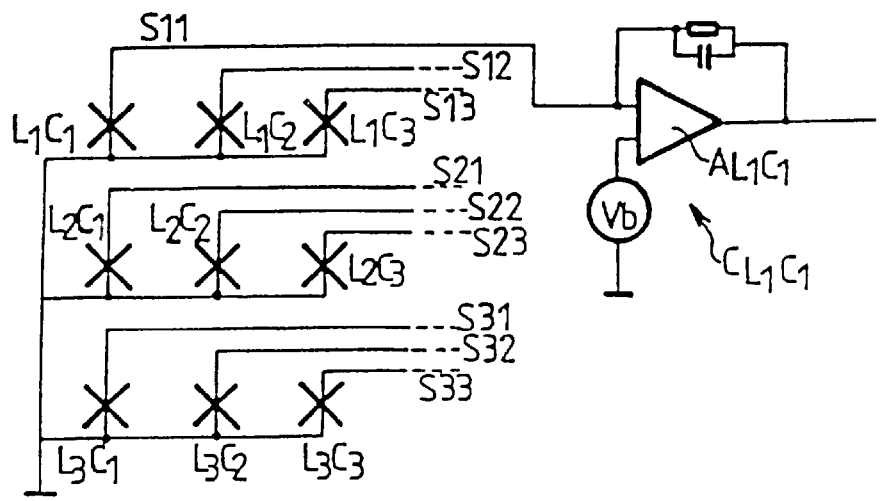

By way of example, FIG. 1a shows a detector matrix comprising 3×3 pixels $L_1C_1$, $L_1C_2$, $L_1C_3$, $L_2C_1$, $L_2C_2$, $L_2C_3$, $L_3L_1$, $L_3C_2$, and $L_3C_3$ organized in rows $L_1$ to $L_3$ and columns $C_1$ to $C_3$. Each detector point or pixel has a top electrode and a bottom electrode. The bottom electrodes are interconnected in the matrix and are biased by an output row I common to all of the pixels.

An output metallization row $S_{11}$, $S_{12}$, $S_{13}$, $S_{21}$, $S_{22}$, $S_{23}$, $S_{31}$, $S_{32}$, and $S_{33}$ is allocated to connecting the top electrode of each pixel so as to connect it to an output stage $C_{L1C1} \ldots C_{L3C3}$, with one stage being used for each pixel.

Interconnecting all of the output wires becomes more and more difficult as the number of pixels increases, which leads to narrow metallization and possibly to multilayer metallization, thereby complicating the method of manufacture. In addition, the metal tracks allocated to the top electrodes cover them in part, creating blind zones that mask the detector, and in which incident photons are not detected.

Figure 2A:
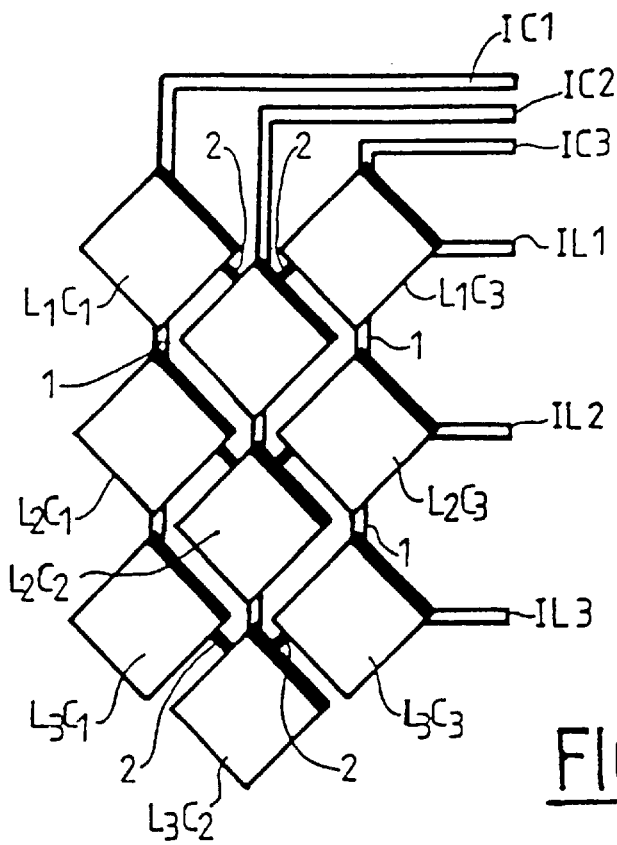
FIGS. 2a and 2b show how pixels and read systems are connected in the invention.
Figure 2B:
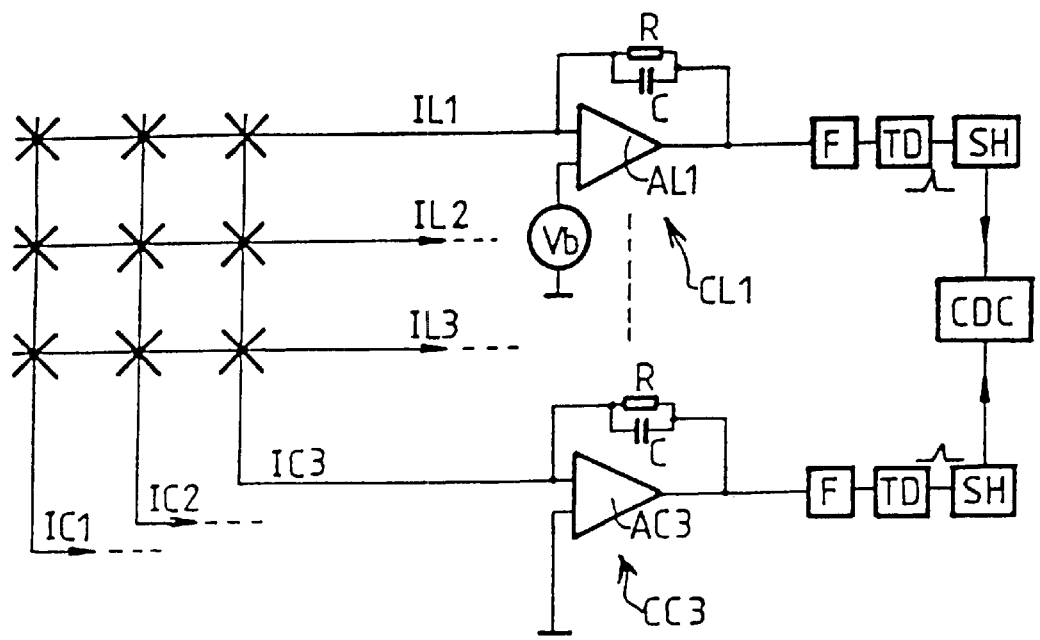

In the invention, and as shown in FIG. 2, the bottom electrodes are interconnected in columns by conductor links 1, each column having an interconnection output $I_{C1}$, $I_{C2}$, or $I_{C3}$, and the top electrodes are interconnected in rows by conductor links 2, each row having an interconnection outlet $IL_1$, $IL_2$, or $IL_3$.

Naturally, it is also possible to interconnect the bottom electrodes in rows and the top electrodes in columns.

Each of the output wires is connected to an input of a read system $CL_1$, $CL_2$, $CL_3$, $CC_1$, $CC_2$, or $CC_3$. By way of example, such a read system can be constituted by a high gain operational amplifier $AL_1$, $AL_2$, $AL_3$, $AC_1$, $AC_2$, or $AC_3$, e.g. having a parallel RC feedback network. One input of each amplifier is coupled to the interconnection output of the corresponding row or column, and its other input is connected to a voltage which is a bias voltage $V_B$ for the rows (amplifiers $AL_1$, $AL_2$, and $AL_3$) and a common pole voltage (or ground) for the columns (amplifiers $AC_1$, $AC_2$, and $AC_3$). Naturally, this bias could be inverted (common pole mode for the rows and bias voltage $V_B$ for the columns).

Advantageously, each of the above amplifiers is coupled to a threshold detector circuit which comprises, for example: a filter F, a threshold detector TD, and a sample-and-hold circuit SH. The threshold detector TD enables an event to be detected providing it generates a signal that exceeds a given threshold. When a photon is absorbed by the pixel of the detector situated at the intersection of row "i" and of column "j", the corresponding acquisition systems detect the event simultaneously. Each event can thus be located by detecting coincidences between row and column amplifiers. For this purpose, the detector can have a coincidence is detector circuit CDC for detecting coincidences between signals detected by the rows and by the columns.

The device of the invention makes it possible significantly to decrease the number of conductor tracks on the detector chip, and also the number of contact areas, and it also reduces the number of conductor links to the acquisition systems, and similarly the number of acquisition systems.

The top electrodes act as conductors and they are interconnected by short links 2 which are situated outside the perimeters of the electrodes, and as a result there is no blind zone.

What is claimed is:

1. An active pixel type detector comprising; M rows and N columns, each pixel having a top detector electrode and a bottom detector electrode, wherein the top detector electrodes are interconnected in rows and columns and the bottom electrodes are interconnected in columns or rows to form a row interconnection output for each row and to form a column interconnection output for each column, each row being taken to a first potential and being coupled to an input of a row amplifier, and each column being taken to a second potential and being coupled to an input of a column amplifier.

2. A detector according to claim 1, the detector being of the superconducting tunnel junction type.

3. A detector according to claim 1, wherein the row amplifiers are high gain amplifiers, each having a first input taken to the first potential and having a second input connected to a corresponding one of said row interconnection outputs.

4. A detector according to claim 1, wherein the column amplifiers are high gain amplifiers each having a first input taken to the second potential and a second input connected to a corresponding one of said column interconnection outputs.

5. A detector according to claim 1, wherein the output of each row amplifier is coupled to a threshold detector circuit.

6. A detector according to claim 1, having a coincidence detector circuit for detecting coincidences between signals detected by the rows and by the columns.

* * * * *